US005452970A

United States Patent [19]

Sundstrom et al.

[11] Patent Number: 5,452,970

[45] Date of Patent: Sep. 26, 1995

[54] DRILL BIT

[75] Inventors: Erik Sundstrom, Sandviken, Sweden; Calörtscher, Gaudenz, Ebikon, Switzerland

[73] Assignee: Sandvik AB, Sandviken, Sweden

[21] Appl. No.: 175,346

[22] PCT Filed: Jul. 7, 1992

[86] PCT No.: PCT/SE92/00510

§ 371 Date: Apr. 13, 1994

§ 102(e) Date: Apr. 13, 1994

[87] PCT Pub. No.: WO93/01921

PCT Pub. Date: Feb. 4, 1993

[30] Foreign Application Priority Data

Jul. 15, 1991 [SE] Sweden .................................. 9102180

[51] Int. Cl.$^{6}$ ...................................................... B23B 51/00

[52] U.S. Cl. ........................... 408/211; 408/225; 408/227

[58] Field of Search .................................... 408/211, 212, 408/227, 228, 223–225, 201, 209

[56] References Cited

U.S. PATENT DOCUMENTS

| | | | |
|---|---|---|---|
| 1,221,247 | 4/1917 | Traylor | 408/224 |
| 2,543,206 | 2/1951 | Smith | 408/225 |
| 2,782,824 | 2/1957 | Robinson | 408/227 |
| 3,997,279 | 12/1978 | Porter | 408/211 |
| 4,043,698 | 8/1977 | Chelberg | 408/201 |
| 4,682,917 | 7/1987 | Williams et al. | 408/212 |

*Primary Examiner*—Steven C. Bishop

*Attorney, Agent, or Firm*—Burns, Doane, Swecker & Mathis

[57] ABSTRACT

Flat drill bit for drilling holes in wood, comprising a plate (12) with two longitudinal sides (16,17), two main radial edges (14,15) and a pilot point with two converging pilot edges (18,19), where main radial edges, pilot edges and short lateral edges (24,26) being short portions of the longitudinal sides all have positive rake angle, produced by grooves parallel to the edges facing forwards during rotation. For larger diameters the pilot point has two converging pilot edges and two parallel sides (27,28).

5 Claims, 1 Drawing Sheet

AA

BB

DRILL BIT

BACKGROUND

Figure 1:
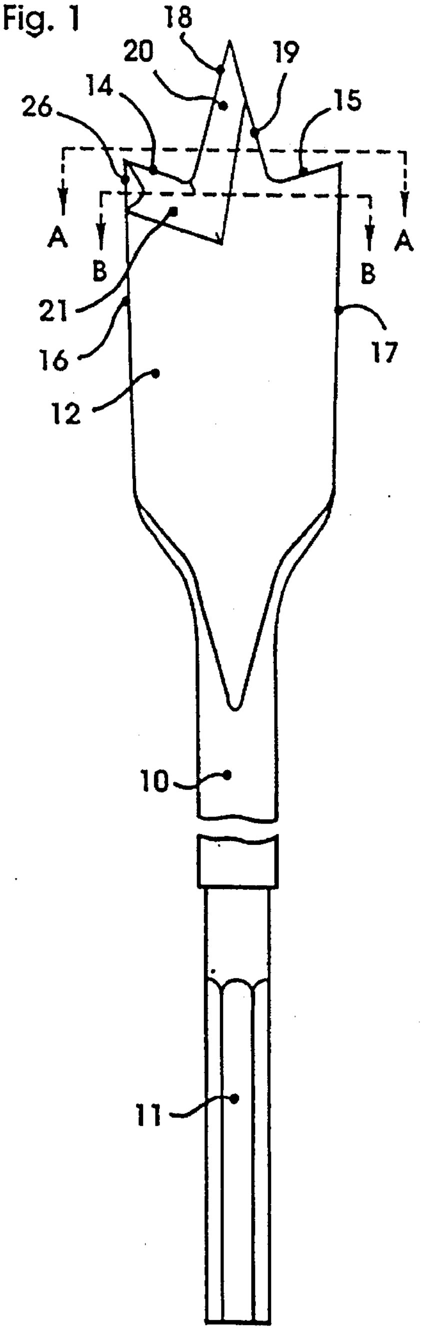

Flat bits are commonly used for drilling of holes with diameter 10 to 40 mm (3/8 to 1 ½ inch) in wood with electric hand drills. Since they are not self-feeding it is easy to control the penetration into the workpiece, and they are thus used above all for shallow holes and for through holes in relatively thin workpieces.

Simple flat bits, described in the U.S. Pat. Nos. 2,794,468 and 4,066,379 consist of a shaft and a flat part made as a plate with substantially even thickness, a triangular pilot point, two substantially radial main cutting edges and two substantially parallel non-cutting longitudinal edges. The shaft is attached to the flat part by welding, by brazing or by a threaded connection. It is in general required that flat bits should be possible to resharpen by filing.

The purpose of the pilot point is to commence the drilling of the hole at a well defined center, to stabilize the drill bit when the radial edges start to cut in order to get a clean non-splintered perimeter at the entry side, and when a through hole is to be drilled to make a pilot hole with small diameter in order to locate and guide the drill when the last part of the hole is drilled from the reverse side of the workpiece.

The purpose of the main radial edges is to cut and transport chips with a low and even force, and to form the major part of the bottom surface of a dead end hole.

These different purposes set partly conflicting requirements for the design of the flat bit, and it has been difficult to satisfy all to an acceptable extent, in spite of many improvements on the original design. A pilot point with even thickness offers acceptable stability but has a large negative rake angle, leading to high cutting force, unsatisfactory chip transport and overheating when drilling in resinous or hard wood. It will also deviate to the side if the hardness of the workpiece is not homogeneous, as in drilling parallel to the fibers or near a knot. The same problems but less serious are found with pyramid-shaped points. A pilot point which has grooves along the edge according to U.S. Pat. No. 2,782,824 has positive rake angle, lower cutting force and better defined position, but will not stabilize the drill well enough when the force on the the main cutting edges varies. All triangular pilot points will also cause a parallel error and lack of accuracy when a through hole is drilled at some other angle than normal to the surface of the workpiece.

A drill bit with a pilot point with partly parallel sides is described in U.S. Pat. No. 2,543,206 and provides good stability and good guiding in through holes, but other features of this drill bit restrict it to drilling with high rpm, slow penetration and limited diameter. Pilot points where the width decreases near the main radial edges are known from U.S. Pat. No. 3,920,350 and lead to somewhat less cutting force but less stability.

The main radial cutting edges are normally located at an angle of 70 to 90 degrees to the drill axis, 90 degrees giving the lowest cutting force when drilling at right angle to the fibres but a greater risk of uneven or splintered perimeter except when drilling with very low feed rate. A smaller angle produces a neater perimeter, less vibrations when entering the workpiece and has less requirements for stabilizing, but needs more cutting force and wears more rapidly. If grooves are made parallel to the main radial edges the rake angle will be positive and the cutting force lower, but the perimeter less neat. It is known from the patent U.S. Pat. No. 4,682,917 to make spurs protruding from the outer ends of the main radial edges in order to sever the fibers before they are touched by the main radial edges. This allows main radial edges at 90 degrees to the drill axis and positive rake angle, producing neat holes with low cutting force, but this type of drill cannot easily be resharpened.

PURPOSE OF THE INVENTION

The invention is a flat drill bit which better than previous types can fill the different requirements. A new design of the outer ends of the main radial edges makes it possible to achieve at the same time a satisfactory hole perimeter, simple resharpening, and low and smooth cutting forces which are simple to stabilize with the pilot point when the main radial edges start cutting. The radial component of the cutting force at each main radial edge can be made so small that there is no difficulty in producing holes overlapping each other or the workpiece edge.

This allows a pilot point with positive rake angle in order to give low cutting force, or for large diameters a combination of positive rake angle and partially parallel sides, to give excellent stability and precision for through holes.

The new design of the outer ends of the main radial edges means that a minor portion of the substantially parallel longitudinal sides of the plate are made as cutting edges with positive rake angle, but without any extending spurs. This will make it possible to balance not only the radial forces from the corner, but also the radial force component appearing along the main radial edge which due to the finite thickness of the plate is not perpendicular to its local direction of motion.

DESCRIPTION

Figure 2:
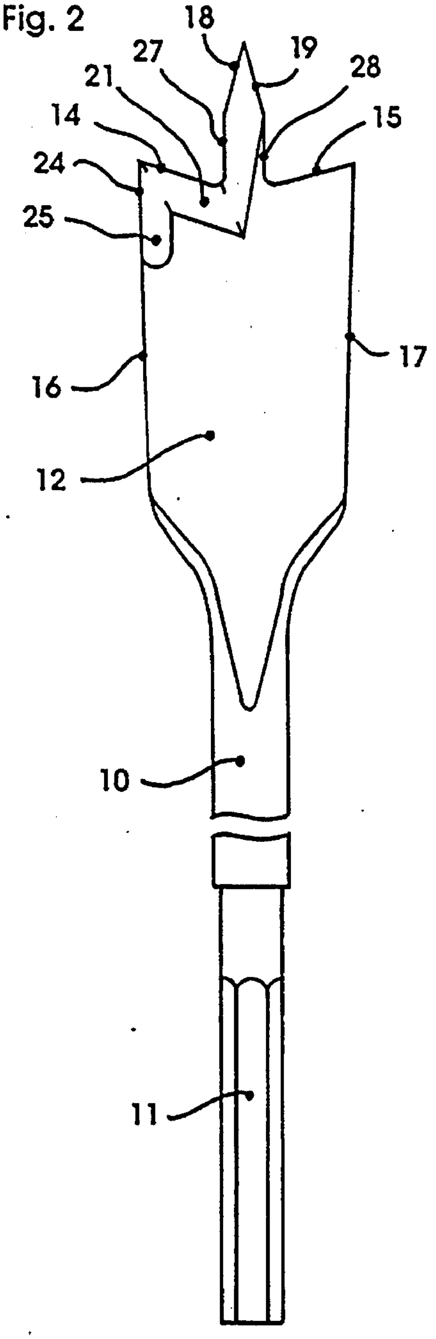
Figure 3:
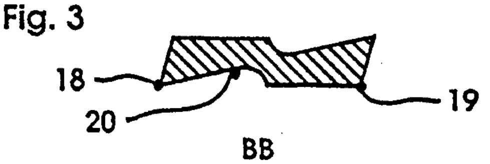
Figure 4:
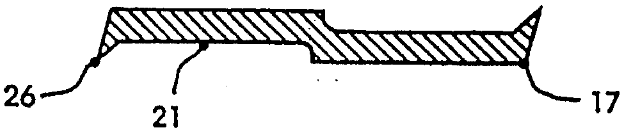

The invention is described with reference to FIGS. 1 and 2, showing alternative embodiments of flat drill bits according to the invention, FIG. 3 showing a cross-section through the pilot point and FIG. 4 showing a cross-section close to the main radial edges.

A flat drill bit according to the invention comprises a plate (12) and a shank (10) the free end (11) of which can be designed for easy clamping by a drill chuck, with three or six flat surfaces. The plate has two longitudinal sides (16,17) which are substantially parallel or preferrably slightly converging towards the shank end, forming an angle not over 2 degrees with the axis of the shank (10), two main radial edges (14,15) forming an angle of from 65 to 90 degrees, preferrably from 70 to 85 degrees, with the axis of the shank (10), and a pilot point with two converging pilot edges (18,19).

On each face of the plate (12) the main radial edge (14) and the pilot edge (18) moving forward are provided with grooves (20,21) milled, ground or swaged along the edges to make the rake angle positive, at least 5 degrees at the main radial edge (14). The longitudinal sides of the plate are blanked or ground at an angle to the faces to provide a relief angle.

The width and depth of the grooves (20,21) are substantially constant along the whole edges (14,18) except in a small region near the end of the main radial edge (14) at the longitudinal side (16), where the depth of the groove is rapidly reduced to create a short lateral edge (26) with positive rake angle. The lateral edge (26) meets the main radial edge (14) in a corner with a slightly acute angle, but without forming a protruding spur. The length of the lateral edge (26) can be equal to the width of the groove (21) as shown in FIG. 1, or the lateral edge (24) can be slightly longer by provision of a groove (25) along a portion of the longitudinal side (16).

The groove (20,21,25) section is preferrably unsymmetric with the deeper parts farther from the edge than half the width of the groove. The drill bit can then be resharpened more times before the rake angle becomes disadvantageous.

In the alternative version shown in FIG. 2, which is preferrably used for diameters above 20 mm (¾ inch) the pilot point is made with both converging pilot edges (18,19) and parallel sides (27,28), with the parallel sides preferrably made with zero relief angle or slightly rounded to give maximal stability against unbalanced radial forces at the main radial edges (14,15) and the lateral edges (24,26). The parallel sides (27,28) should be so long that they at least to some extent have entered the workpiece before the main radial edges (14,15).

When drilling a hole with a drill bit according to FIG. 2 the first part of the hole is drilled from the front of the workpiece far enough that the parallel sides (27,28) of the pilot point have penetrated the reverse side of the workpiece, and the last part of the hole from the reverse side. Since the parallel sides will then follow a a cylindrical pilot hole the first and last parts of the hole will match perfectly and the hole perimeter on the reverse side will be free of splinters and chipping.

When drilling a hole at an oblique angle to the workpiece surface the critical moment is when the outer end of the main radial edge (14) starts to cut into the surface. If the cutting force at this end is larger than the forces at the pilot point, there is a risk that the drill bit will rotate around some other axis than the pilot point, and damage the workpiece surface. The risk is especially great if the main radial edge (14) joins a non-grooved longitudinal side (16). A drill bit according to the invention has positive rake angle at the main radial edge (14) as well as at the first cutting edge part (24,26) of the longitudinal side (16). The cutting force is then much lower, and easier to balance with forces on the pilot point. For large diameter drills the high tangential velocity will increase the cutting force at the outer end of the main radial edge (14), and to balance this with higher forces at the pilot point it is advantageous to make the pilot point with partly parallel sides (27,28) according to FIG. 2. A very great force would then be needed to tear the pilot point from its hole in the work piece.

We claim:

1. Flat drill bit for drilling holes in wood, comprising:

a plate with two substantially parallel longitudinal sides, two main radial edges which have outer ends forming acute angles with the longitudinal sides without protruding spurs, short lateral edges which are portions of the longitudinal sides, a pilot point which has two converging pilot edges along at least part of its length and having a positive rake angle at the pilot edges, at the main radial edges and at the short lateral edges, said positive rake angle being produced by grooves along the edges facing forwards during rotation.

2. Flat drill bit according to claim 1, wherein the length of the lateral edges is not less than the width of the groove along the main radial edge and is not more than half the length of the longitudinal sides.

3. Flat drill bit according to claim 1, wherein the pilot point has two converging pilot edges and two parallel sides.

4. Flat drill bit according to claim 3, wherein the parallel sides are made without clearance angle.

5. Flat drill bit according to claim 3, wherein the parallel sides are rounded.

* * * * *